(12) United States Patent
Renaud et al.

(10) Patent No.: US 12,267,760 B2
(45) Date of Patent: Apr. 1, 2025

(54) SYSTEM FOR GEOLOCATING AT LEAST TWO OBJECTS

(71) Applicant: PA.COTTE SA, Pully (CH)

(72) Inventors: Dorine Renaud, Sainte Luce sur Loire (FR); Mathieu Porez, Sainte Luce sur Loire (FR)

(73) Assignee: PA.COTTE SA, Pully (CH)

( * ) Notice: Subject to any disclaimer, the term of this patent is extended or adjusted under 35 U.S.C. 154(b) by 0 days.

(21) Appl. No.: 18/701,009

(22) PCT Filed: Oct. 11, 2022

(86) PCT No.: PCT/EP2022/078165
§ 371 (c)(1),
(2) Date: Apr. 12, 2024

(87) PCT Pub. No.: WO2023/061966
PCT Pub. Date: Apr. 20, 2023

(65) Prior Publication Data
US 2024/0334170 A1  Oct. 3, 2024

(30) Foreign Application Priority Data
Oct. 14, 2021 (FR) ..................... 2110873

(51) Int. Cl.
*H04W 4/80* (2018.01)
*G06Q 10/0833* (2023.01)
(Continued)

(52) U.S. Cl.
CPC .......... *H04W 4/80* (2018.02); *G06Q 10/0833* (2013.01); *H04W 4/029* (2018.02); *H04W 4/35* (2018.02); *H04W 88/06* (2013.01)

(58) Field of Classification Search
CPC ......... H04W 4/80; H04W 4/029; H04W 4/35; H04W 88/06; G06Q 10/0833
See application file for complete search history.

(56) References Cited

U.S. PATENT DOCUMENTS 6,975,941 B1 * 12/2005 Lau .................... G01C 21/3415
340/988

FOREIGN PATENT DOCUMENTS

GB      2503058       12/2013
GB      2503058 A  * 12/2013  ............. B65D 51/24
(Continued)

OTHER PUBLICATIONS

International Search Report and Written Opinion issued by the International Searching Authority, dated Jan. 17, 2023, for International Patent Application No. PCT/EP2022/078165; 16 pages.
(Continued)

*Primary Examiner* — James J Yang
(74) *Attorney, Agent, or Firm* — Faegre Drinker Biddle & Reath LLP

(57) ABSTRACT

A geolocation system includes at least two items to be geolocated, each item including a first wireless proximity communication means, able to communicate with wireless proximity communication means of another item; a long-range communication means; a geolocation device; and a processing unit. The system implements a computer platform including communication means able to communicate with the long-range communication means of the items. The processing unit of one item is configured to open a channel of communication with another item by way of wireless proximity communication means, and transmit to the computer platform the geolocation data supplied by the processing unit of the other item.

9 Claims, 1 Drawing Sheet

(51) Int. Cl.
    *H04W 4/029*    (2018.01)
    *H04W 4/35*    (2018.01)
    *H04W 88/06*    (2009.01)

(56) References Cited

FOREIGN PATENT DOCUMENTS

WO    2017/184616    10/2017
WO    WO-2017184616 A1 *    10/2017    .............. G01S 5/00

OTHER PUBLICATIONS

English translation of International Search Report issued by the International Searching Authority, dated Jan. 17, 2023, for International Patent Application No. PCT/EP2022/078165; 2 pages.
English translation of Written Opinion issued by the International Searching Authority, dated Jan. 17, 2023, for International Patent Application No. PCT/EP2022/078165; 3 pages.
English translation of the Written Opinion as issued by the International Searching Authority, dated Apr. 16, 2024, for International Patent Application No. PCT/EP2022/078165; 7 pages.

\* cited by examiner

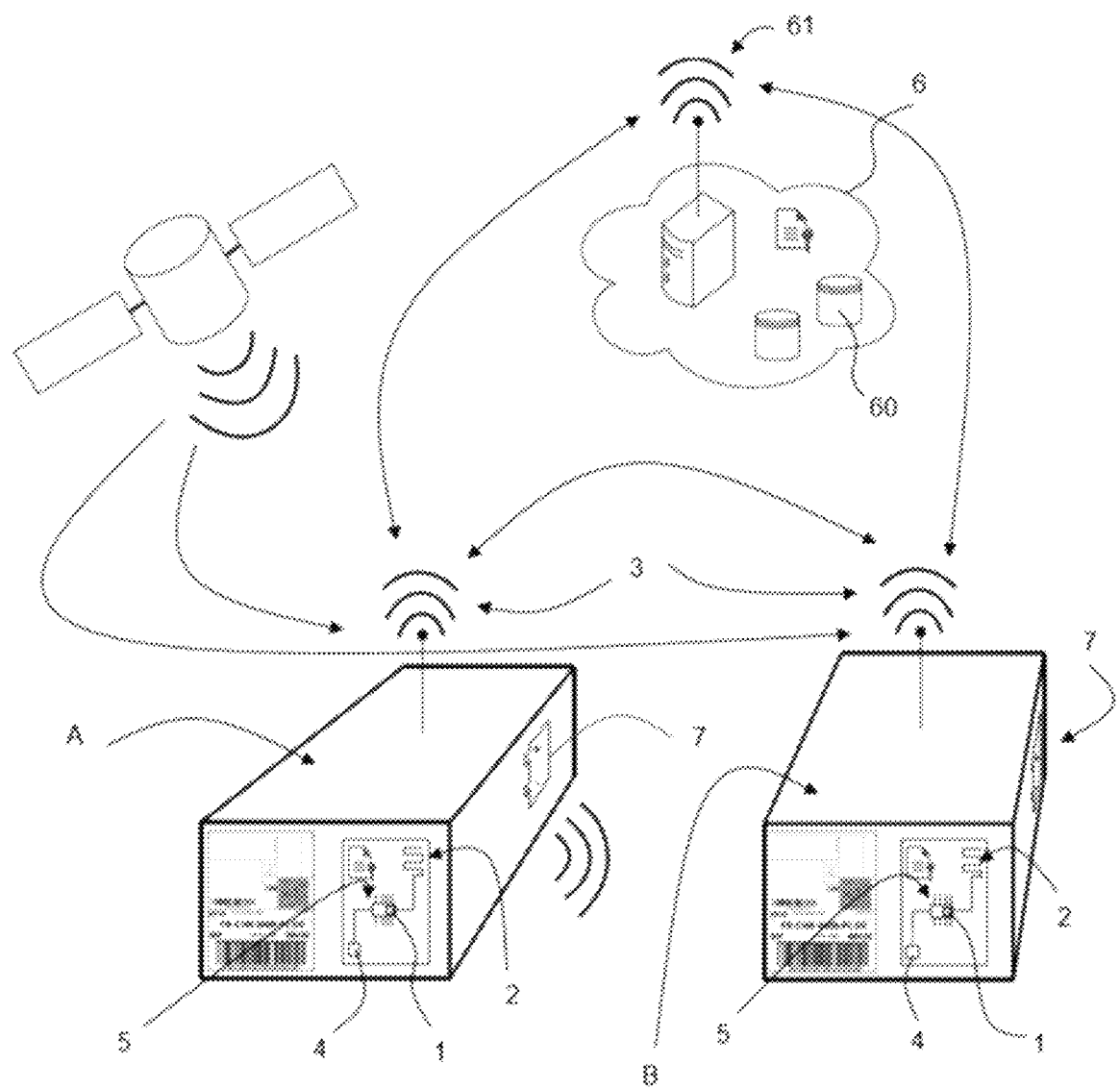

SYSTEM FOR GEOLOCATING AT LEAST TWO OBJECTS

CROSS-REFERENCE TO RELATED APPLICATIONS

The present application is a national stage entry of International (PCT) Patent Application Number PCT/EP2022/078165, filed Oct. 11, 2022, which claims priority to French Patent Application Number 2110873, filed Oct. 14, 2021, the complete disclosures of which are expressly incorporated herein by reference.

The field of the invention is that of logistics.

More specifically, the invention relates to the shipping of items, and more specifically, the shipping of smart and connected items.

In the field of the invention, providers of services involving the online purchase and sale of products are now common and numerous, using delivery logistics systems based on a centralized control approach based, in particular, on:
  the grouping of the goods to be shipped;
  mass transportation;
  sending by package.

Increasingly, in such logistics systems, it is conventional for the position of the item to be known in real time, to locate it in relation to its arrival point and/or in relation to the individuals awaiting delivery of the item. In this context, to track the movement of the items to be shipped, the latter are equipped with geolocation means and communication means allowing them to transmit data related to their location. In this way a system of traceability of the shipping of the items is obtained.

In other words, the built-in electronics in the items, and in particular in packages containing items to be shipped, provide the capacity for telemetry and tracking in time and space. Thus, such packages are capable of measuring physical quantities, recording them and transmitting them to a remote information system taking the form of a computer platform.

Concerning the tracking function, the package contains a geolocation device, the data of which can, like those coming from the telemetry, be recorded then transmitted to the computer platform.

These geolocation data comprise at least the following data:
  the time and date;
  the longitude, latitude and altitude;
  the speed;
  the accuracy (in meters, accuracies on the horizontal and vertical positions provided by the geolocation system).

Depending on the service offered by the service providers, the activation frequency of the different built-in devices can be more or less sustained and, where applicable, affect the energy independence of the package more or less severely. This impact is expressed in terms of reduction of the number of deliveries possible for one battery charging.

It will therefore be understood that the function of tracking of the items during shipping is based on a periodic satellite geolocation measurement. Thus, in the case of N packages in a van, according to the prior art, each package is required, asynchronously, to take a geolocation measurement in a predetermined time interval. For a commercial offering of the service provider consisting in taking two location points per hour, a fleet takes 2×N geolocation points in one hour, some of which are taken simultaneously while others are unsuccessful (for example due to a fault of communication with a satellite).

In other words, a frequent activation of the geolocation device gives rise to a technical problem, which is the supply of electrical power and the means of geolocation and communication. Specifically, to maintain a significant number of uses of the package, provision must be made for recourse to a system for recharging the electricity of the power supply means dedicated to the geolocation of the packaging, which can entail limitations which are hard to manage.

The electrical recharging function of the battery is one possible solution. It may also be envisioned to equip the package with a built-in electrical capacitor which is non-rechargeable but sufficient to achieve the desired number (as stipulated in the specifications book) of deliveries by the operating customer, based on the design of the geolocation device. However, continuing with such a strategy would give rise to the handling of a so-called "dead" weight of battery during transportation.

The invention in particular has the aim of palliating this drawback of the prior art.

More precisely, the aim of the invention is to make provision for a system for the geolocation of items to be shipped which does not involve any limitations, or at least limits them, regarding the management of the electrical recharging level of the technical means, coupled with the items to be shipped and involved in the spatio-temporal traceability of the items.

Another aim of the invention is to provide such an item geolocation system, one which is practical and simple to use for the service providers involved in the shipping of the items.

These aims, along with others which will appear hereinafter, are achieved owing to the invention which has as subject a geolocation system comprising:
  at least two items to be geolocated, each item including:
    a recognition code;
    first wireless proximity communication means, able to communicate with first wireless proximity communication means of another item;
    second long-range communication means;
    a geolocation device;
    a processing unit configured to transmit an activation signal of the geolocation device at regular time intervals and able to receive and store geolocation data supplied by the geolocation device, and configured to assign them a positive validity status during a predetermined time period, and a negative validity status beyond the predetermined time period
  a computer platform including at least one database relating to the items listing the recognition codes of all the items and including third long-range communication means able to communicate with the second long-range communication means of the items,
characterized in that the processing unit of one item is configured to, prior to the transmission of the activation signal:
  open a channel of communication with another item by way of the wireless proximity communication means
  receive the validity status of the other item, and,
  if the validity status of the other item is positive, receive geolocation data stored in the processing unit of the other item and maintain the geolocation device in an inactive state,
  transmit to the computer platform the geolocation data supplied by the processing unit of the other item.

Thus, owing to the invention, one obtains a system of geolocation of items shipped in lots (i.e. grouped into a means of transportation for example, but also optionally grouped into a container or else in a logistics hub), or, in other words, into a fleet, in which the sharing of the geolocation data is organized.

The technical means related to the geolocation means consume a great deal of electrical energy. In a system according to the invention, these are only activated (and therefore only consume energy) if it is not possible to obtain and exploit geolocation data of another item placed directly nearby, or at least placed such that the wireless proximity communication means allow two physically neighboring items to communicate with one another.

If an item can receive the geolocation data of another item, then the technical means related to geolocation are not activated and only the means involving low electrical power consumption are in operation, such as precisely those wireless proximity communication means.

As a result it is possible to electrically power the technical means coupled to the shipped item by a simple battery, able to independently ensure an electrical power supply over a long time period. The built-in devices can thus travel long distances in full electrical independence. In addition, they can be reused many times over, without having to recharge them electrically, while coupled to different successive items to be shipped.

Of course, the possibility to reuse the built-in devices several times over is an obvious economic benefit of the traceability system, along with an optimized carbon budget by avoiding the rapid obsolescence of the built-in devices, in full or in part. It should be noted that the electrical power supply can be incorporated into the item or into the package in which the item is contained, as can be seen from the scenario described previously. However, without departing from the scope of the invention it is also possible to envision making provision for an external electrical power supply, possible by a wireless energy transmission technique.

It should also be noted that, according to an important feature of the invention, a geolocation datum stored in an item, and liable to be transmitted to another item of the fleet, has a limited and predetermined validity time period. This is because, insofar as the items of the system are by nature intended to be in shipment, it is necessary to ensure that the geolocation data are regularly updated.

It should also be noted that the geolocation data can be provided by satellite, but also by another other appropriate means and in particular by a cellular geolocation system or GSM, or a system of geolocation by long-, medium- and short-range communication interfaces such as LoRa, WiFi, UHF, etc. These additional location means are all associated with specific Cloud services linking known and referenced RF database identifiers with geographical positions.

According to an advantageous solution, the processing unit of one item is configured to receive, with the geolocation devices stored in the processing unit of the other item, the positive validity status of the other item.

In this way, an item receiving the geolocation data of another item can in turn indicate to a third item that it holds geolocation data with a positive validity status.

In this case, a processing unit of one item is advantageously configured to receive, with the positive validity status of the other item, a remaining validity time period.

It will therefore be understood that, according to this feature, once the positive validity status has expired, the validity status is declared negative. Another item which communicates with the item for which the validity status of the geolocation data is negative, then does not receive the data of this item and will optionally continue to search for other items of the fleet which have geolocation data with a positive status.

Preferably, the processing unit of one item is configured to program in time, at the end of the remaining validity time period, an activation signal of the geolocation device.

In this way, in addition to making provision for the change in the validity status of the geolocation data, the processing unit of the item is parameterized to reprogram, according to the time interval initially planned, the time of the next acquisition of geolocation data, and therefore of the activation of the geolocation device.

According to an advantageous solution, the remaining validity time period of a validity status is at least two times less than that of a time interval separating two activation signals.

Preferably, in a geolocation system comprising a number N of items, the remaining validity time period of a validity status is N times less than that of a time interval separating two activation signals.

Such an organization of the system achieves a very significant optimization of the reduction in energy consumption of all the items of the fleet, wherever possible promoting exchanges between the items via the wireless proximity communication means, which do not consume much energy, by comparison with the activation and use of the geolocation devices.

According to a preferred embodiment, the items have built-in electrical power supply means.

Such electrical power supply means can of course be rechargeable.

As indicated previously, it is alternatively possible to make provision, without departing from the context of the invention, for external electrical power supply means.

Preferably, the processing unit of one item, following the transmission of the activation signal, is configured to transmit the geolocation data supplied by the geolocation device and the computer recognition code of the item to the computer platform.

According to a preferred solution, the processing unit of one item is configured to receive, with the geolocation data stored in the processing unit of the other item, the computer recognition code of the other item.

Thus, one avoids the possibility of falsifying the geolocation data by transmitting erroneous data to an item for it to transmit them in turn to the platform. Specifically, if the geolocation data are not associated with a recognition code, the platform can recognize if the data come from an item that is not part of its database and which is therefore considered as unreliable. Conversely, the reception of a recognition code allows the platform, configured accordingly of course, to consider as reliable the geolocation data associated with said recognition code. In other words, such a system makes it possible to prevent any fraud, such as the spoofing of a tracking device by a third party and the transmission to the platform of an erroneous position (but one which is valid from the point of view of the invention) covering an act of vandalism in progress.

According to another embodiment that can be envisioned, the system according to the invention uses a set of public and private keys (a security mechanism well-known to those skilled in the art). In this case, all the processing units of the items listed in the "items" database of the computer platform are parameterized to transmit the geolocation data to the computer platform or to another item, the geolocation data being encrypted according to an encryption protocol provided by the computer platform. A conventional procedure for signing and encrypting data (here geolocation data) is carried out by all the geolocation devices wishing to make an item of information available. The data are signed via a single private key, distinctive to each device and stored in a built-in, secure and unbreachable memory. The authentication of the geolocation message of the devices by the platform is done by the public key recorded at subscription (the recording of an item to be geolocated in the database of the platform).

According to an advantageous implementation of the geolocation system according to the invention, the items consist of packages, each containing a built-in device comprising:
- the processing unit;
- the recognition code;
- the first communication means;
- the second communication means;
- the geolocation device.

Other features and advantages of the invention will become more clearly apparent on reading the following description of a preferred embodiment of the invention, given by way of illustrative and non-limiting example, and of the appended drawings consisting of:

FIG. 1 which schematically illustrates a system of geolocation of a fleet of items to be shipped.

As illustrated by FIG. 1, a geolocation system according to the invention comprises, in a manner known per se:
- at least two items A, B to be geolocated (or more generally a fleet of N items to be geolocated), each including a built-in intelligence or communications means described hereinafter, each item in particular bearing a computer recognition code 1;
- a computer platform 6, including at least one database 60 listing the computer recognition codes 1 of all the items.

In addition to a computer recognition code 1, each item includes:
- first wireless proximity communication means 2, typically a Bluetooth or BLE (Bluetooth Low Energy) antenna, able to communicate with first wireless proximity communication means 2 of another physically neighboring item;
- second long-range communication means 3;
- a satellite geolocation device 4;
- a computer processing unit 5.

More generally, the items are each instrumented (i.e. they each contain a geolocation device). Thus, the geolocation devices used can be various or, in other words, of different technologies and/or manufacturers, but including at least the basic functional elements, to allow the acquisition of geolocation data.

Each item therefore includes an antenna or, more generally, a short-range communication interface, preferably low-energy.

Moreover, each item includes electrical power supply means 7.

The computer platform 6 meanwhile includes third long-range communication means 61, able to communicate with the second long-range communication means 3 of the items. Second and third long-range communication means are provided in particular by GSM system.

In addition, for each item, the computer processing unit 5 is configured to transmit an activation signal of the geolocation device at regular time intervals. Moreover, the computer processing unit is able to receive and store geolocation data supplied by the geolocation device 4. The computer processing unit is also configured to assign to the geolocation data supplied by the geolocation device a positive validity status for a predetermined time period starting from the receipt of the geolocation data. Once the predetermined time period has elapsed, the computer processing unit changes the validity status which becomes a negative validity status.

According to the principle of the invention, the computer processing unit 5 of each item is also configured to, prior to the transmission of the activation signal:
- open a channel of communication with another item by way of the first wireless proximity communication means 2;
- read the validity status of the other item, and,
- if the validity status of the other item is positive, receive geolocation data stored in the processing unit 5 of the other item and maintain in an inactive state the geolocation device 4 of the item currently acquiring geolocation data,
- transmitting, to the computer platform 1, the geolocation data supplied by the processing unit of the other item.

The computer processing unit 5 of each item is additionally configured to:
- receive, with the geolocation data stored in the processing unit of the other item, the positive validity status of the other item;
- receive, with the positive validity status of the other item, a remaining validity time period;
- program in time, at the end of the remaining validity time, an activation signal of the geolocation device.

According to a particular embodiment, the geolocation system comprises a number N of items, and the remaining time period of a validity status is N times less than that of a time interval separating two activation signals. Thus, in the special case illustrated by FIG. 1, in which the system comprises two items, the remaining time period of a validity status is twice less than that of a time interval separating two activation signals.

The value of N is obtained by the item to be geolocated during the scanning of the surrounding items with which it can communicate.

As illustrated by FIG. 1, the items consist of packages containing a built-in device comprising:
- the computer processing unit 5;
- the recognition code 1;
- the first wireless proximity communication means;
- the second-long-range communication means;
- the geolocation device.

An example of operation of a geolocation system according to the invention implementing only two items, as appears in FIG. 1, is described hereinafter.

If one considers the items A and B (taking for example the form of packages) contained in a van, a phase of geolocation of the items can take place in the following manner.

In a first phase, the two items A and B are on standby. This means that the processing unit 5 of each item permits only the operation of the first wireless proximity communication means 2, such as to transmit the status of the geolocation data stored in the processing unit. It should be noted that these geolocation data can be void or expired.

For the example described hereinafter, the validity status of the geolocation data is considered as having a negative status.

If the processing unit of one of the packages (in this case that of the packaging A) triggers a phase of acquisition of geolocation data, prior to the transmission of an activation signal of the geolocation device 4 of the item A (the processing unit being, as a reminder, configured to transmit such an activation signal at regular time intervals), the processing unit is configured to search for another item of the same type (therefore the item B in our example) in its immediate environment, using the first wireless proximity communication means 2.

The processing unit of the item A will then detect the presence of the item B and will thus access the validity status of the geolocation data of the item B, this status being negative according to the original assumption.

In this case, since the processing unit of the item A does not have the ability to retrieve the geolocation of the item B, the processing unit of the item A activates the geolocation device 4 of the item A. Satellite geolocation data are retrieved by way of the geolocation device, then stored by the processing unit of the item A by assigning a positive validity status to said geolocation data. At this stage, the item A is put back into "standby" by its processing unit.

Consequently, the computer processing unit of the item B, programmed to trigger a geolocation measurement at regular time intervals, transmits an activation signal of geolocation of the item B. In this example, it is accepted that this activation signal is transmitted before the end of the positive validity status of the geolocation data stored in the processing unit of the item A.

In turn, the computer processing unit of the item B attempts to open a channel of communication with the surrounding item or items by way of its first wireless proximity communication means. This step leads the processing unit of the item B to detect the item A, for which it will read the positive validity status of the geolocation data stored in the processing unit of the item A. Then, the item B, connected to the item A, receives the geolocation data of the item A, along with the remaining validity time period of the geolocation data of the item A.

Once the geolocation data have been received by the item B, the computer processing unit of the item B assigns a positive validity status to the geolocation data that it has stored. Furthermore, the computer processing unit programs in time the transmission of the next activation signal of the geolocation device, and does so on the expiry of the validity of the geolocation data.

Note that the time periods of the positive validity statuses are significantly shorter than the regular time intervals with which the processing units are configured to transmit an activation signal of the geolocation devices.

In this scenario, the processing unit of the item B triggers a search for geolocation data at a time t at which the validity status of the geolocation data of the item A is negative.

Thus, when the processing unit of the item B enters into communication with the computer processing unit of the item A, no valid geolocation data is detected in the item A.

This results in the processing unit of the item B transmitting an activation signal of the geolocation device of the item B, which enters into communication with a satellite to acquire geolocation data which are stored in the computer processing unit of the item B by assigning them a positive validity status.

Afterwards, it is the turn of the computer processing unit of the item A to trigger a search for geolocation data. The computer processing unit of the item A will then proceed according to the steps already described with reference to the computer processing unit of the package B.

Of course, the geolocation data of the items can be transmitted to the computer platform 6, at any time, either triggered periodically by the computer processing units of the items, or at the request of the computer platform addressed to the computer processing units of the items.

The invention claimed is:

1. A geolocation system comprising:
   at least two items to be geolocated, each item including:
      a computer recognition code,
      a first wireless proximity communication means to communicate with first wireless proximity communication means of another item,
      a second long-range communication means,
      a geolocation device,
      a processing unit configured to transmit an activation signal of the geolocation device at regular time intervals and to receive and store geolocation data supplied by the geolocation device, and configured to assign them to said geolocation data a positive validity status during a predetermined time period, and a negative validity status beyond the predetermined time period;
   a computer platform including at least one database relating to the items listing the computer recognition codes of all the items and including third long-range communication means to communicate with the second long-range communication means of the items;
   wherein the processing unit of each item is configured to, prior to the transmission of the activation signal:
      open a channel of communication with another item of the at least two items, via the wireless proximity communication means,
      read the validity status of the other item of the at least two items, and,
      if the validity status of the other item of the at least two items is positive, receive geolocation data stored in the processing unit of the other item of the at least two items and maintain the geolocation device in an inactive state,
      transmit to the computer platform the geolocation data supplied by the processing unit of the other item of the at least two items.

2. The geolocation system of claim 1, wherein the processing unit of one item is configured to receive, with the geolocation data stored in the processing unit of the other item, the positive validity status of the other item of the at least two items.

3. The geolocation system of claim 2, wherein the processing unit of one item of the at least two items is configured to receive, with the positive validity status of the other item of the at least two items, a remaining validity time period.

4. The geolocation system of claim 3, wherein the processing unit of one item of the at least two items is configured to program in time, at the end of the remaining validity time period, an activation signal of the geolocation device.

5. The geolocation system of claim 4, wherein the remaining validity time period of the positive validity status is at least two times less than that of a time interval separating two activation signals.

6. The geolocation system of claim 5, wherein the geolocation system comprises a number N of items, and in that the remaining time period of a validity status is N times less than that of a time interval separating two activation signals.

7. The geolocation system of claim 1, wherein the processing unit of one item of the at least two items, following the transmission of the activation signal, is configured to transmit the geolocation data supplied by the geolocation device and the computer recognition code of that item to the computer platform.

8. The geolocation system of claim 7, wherein the processing unit of one item of the at least two items is configured to receive, with the geolocation data stored in the processing unit of the other item of the at least two items, the computer recognition code of the other item of the at least two items.

9. The geolocation system of claim 1, wherein the items consist of packages, each containing a built-in device comprising:
- the processing unit,
- the computer recognition code;
- the first wireless proximity communication means;
- the second long-range communication means;
- the geolocation device.

\* \* \* \* \*

UNITED STATES PATENT AND TRADEMARK OFFICE
CERTIFICATE OF CORRECTION

PATENT NO. : 12,267,760 B2
APPLICATION NO. : 18/701009
DATED : April 1, 2025
INVENTOR(S) : Dorine Renaud et al.

Page 1 of 1

It is certified that error appears in the above-identified patent and that said Letters Patent is hereby corrected as shown below:

In the Specification

• At Column 2, Line 50, delete "period" and insert --period;--;

In the Claims

• At Column 8, Claim 1, Line 18, delete "assign them" and insert --assign--; and
• At Column 9, Claim 9, Line 13, delete "unit," and insert --unit;--.

Signed and Sealed this
Nineteenth Day of August, 2025

Coke Morgan Stewart
*Acting Director of the United States Patent and Trademark Office*